United States Patent
Edwards et al.

(10) Patent No.: US 10,657,375 B1
(45) Date of Patent: May 19, 2020

(54) AUGMENTED REALITY SYSTEM FOR FACILITATING CURRENCY CONVERSION

(71) Applicant: Capital One Services, LLC, McLean, VA (US)

(72) Inventors: Joshua Edwards, McLean, VA (US); Abdelkader Benkreira, McLean, VA (US); Michael Mossoba, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/682,286

(22) Filed: Nov. 13, 2019

(51) Int. Cl.
| | | |
|---|---|---|
| G06K 9/00 | (2006.01) | |
| G06T 7/246 | (2017.01) | |
| G10L 15/22 | (2006.01) | |
| G06Q 20/38 | (2012.01) | |
| G10L 15/18 | (2013.01) | |

(52) U.S. Cl.
CPC ....... *G06K 9/00671* (2013.01); *G06Q 20/381* (2013.01); *G06T 7/246* (2017.01); *G10L 15/1815* (2013.01); *G10L 15/22* (2013.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 9,104,661 B1* | 8/2015 | Evans | ............ | G06F 17/28 |
| 9,547,917 B2* | 1/2017 | Zamer | ............ | G06K 9/00624 |
| 2004/0122678 A1* | 6/2004 | Rousseau | ............ | G06F 17/28 |
| | | | | 704/277 |
| 2006/0294004 A1* | 12/2006 | Burge | ............ | G06Q 20/10 |
| | | | | 705/39 |
| 2013/0253900 A1* | 9/2013 | Escobedo | ............ | G06F 17/289 |
| | | | | 704/2 |
| 2014/0019273 A1* | 1/2014 | Sprowl | ............ | G06Q 20/381 |
| | | | | 705/16 |
| 2014/0064624 A1* | 3/2014 | Kim | ............ | G06K 9/0063 |
| | | | | 382/201 |
| 2014/0297256 A1* | 10/2014 | Rogowski | ............ | G06F 17/289 |
| | | | | 704/2 |
| 2015/0134318 A1* | 5/2015 | Cuthbert | ............ | G06F 17/289 |
| | | | | 704/2 |
| 2017/0091760 A1* | 3/2017 | Baumwald | ............ | G06Q 20/381 |
| 2019/0325511 A1* | 10/2019 | Taylor | ............ | G06T 19/006 |

* cited by examiner

*Primary Examiner* — Robert Bader
(74) *Attorney, Agent, or Firm* — Pillsbury Winthrop Shaw Pittman LLP (57) ABSTRACT

In certain embodiments, augmented-reality-based currency conversion may be facilitated. In some embodiments, a wearable device (or other device of a user) may capture a live video stream of the user's environment. One or more indicators representing at least one of a currency or units of the currency may be determined from the live video stream, where at least one of the indicators correspond to a feature in the live video stream. Based on the indicators from the live video stream, a predicted equivalent price corresponding to the units of the currency may be generated for a user-selected currency. In some embodiments, the corresponding feature in the live video stream may be continuously tracked, and, based on the continuous tracking, the corresponding feature may be augmented in the live video stream with the predicted equivalent price.

20 Claims, 5 Drawing Sheets

AUGMENTED REALITY SYSTEM FOR FACILITATING CURRENCY CONVERSION

FIELD OF THE INVENTION

The invention relates to augmented-reality-based currency conversion, including, for example, augmented-reality-based conversion of a price in a local currency to a predicted equivalent price in another currency.

BACKGROUND OF THE INVENTION

Advances in technology have made translation less burdensome for users when traveling abroad in foreign countries in which the users do not speak the language. Despite such advancements, users may find it difficult to achieve a seamless, automatic currency conversion from a local currency while making purchases in foreign countries. As an example, with respect to a particular product with a price tag in a local currency, a user may sometimes have to manually input the price on the price tag into a currency conversion application on a user device in order to convert to the equivalent price in the currency of the user's own country, all while trying to haggle with the vendor of the product in a local language. Furthermore, sometimes a travelling user may not be able to determine the context of a price given orally for a product in a foreign country, due to their lack of ability to understand the local language, and use that in combination with visual cues to determine the price of a product in a local currency, such as on price tags or advertisements. Thus, in such cases, a user may be inconvenienced and confused. These and other drawbacks exist.

SUMMARY OF THE INVENTION

Aspects of the invention relate to methods, apparatuses, and/or systems for facilitating augmented-reality-based currency conversion.

In some embodiments, a live video stream of an environment may be obtained via a wearable device. Image-derived indicators may be derived from an image portion of the live stream video, and audio-derived indicators may be derived from the audio portion of the live video stream. As an example, one or more of the indicators may represent one or more features in the live video stream (e.g., price tags, advertisements, store displays, utterances, or other features in the live video stream). Based on the indicators extracted from the live video, a local currency and units of the local currency may be determined. In some embodiments, a predicted equivalent price (corresponding to the units of the local currency) in a user-selected currency may be generated based on the image-derived and audio-derived indicators, and the corresponding feature in the live video stream may be augmented in real-time with the predicted equivalent price.

In some embodiments, image recognition may be performed on the image portion of the live video stream to extract an image-derived indicator in real time from the image portion of the live video stream. Natural language processing may be performed on the audio portion of the live video stream to extract an audio-derived indicator in real time from the audio portion of the live video stream. As an example, the audio-derived indicator may represent the local currency, and the image-derived indicator may represent units of a local currency that correspond to a feature in the image portion of the live video stream. The predicted equivalent price (corresponding to the units of the local currency) in the user-selected currency may be generated based on (i) the image-derived indicator from the live video stream and (ii) the audio-derived indicator from the live video stream. The corresponding feature in the live video stream may be continuously tracked, and, based on the continuous tracking, the corresponding feature may be augmented with the predicted equivalent price in the live video stream such that the predicted equivalent units of the user-selected currency is displayed proximate the corresponding feature in the live video stream.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
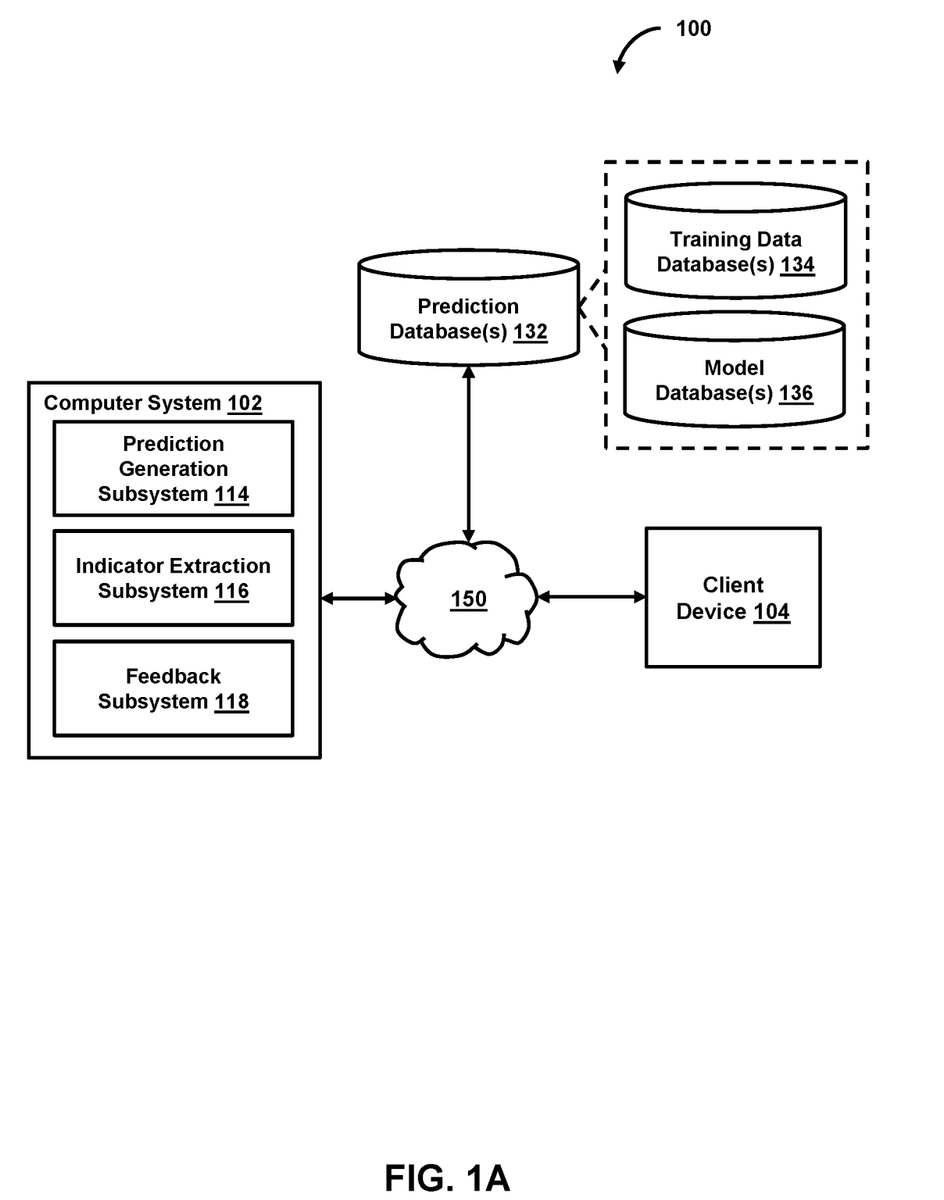
FIG. 1A shows a system for facilitating augmented-reality-based currency conversion, in accordance with one or more embodiments.

FIG. 1 shows a system 100 for facilitating augmented-reality-based currency conversion, in accordance with one or more embodiments. As shown in FIG. 1, system 100 may include computer system 102, client device 104, or other components. Computer system 102 may include prediction generation subsystem 114, indicator extraction subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may obtain image-based or audio-based indicators that are representative of a local currency or units of the local currency used in a user's environment. For example, an indicator extraction subsystem 116 may extract indicators from the live video stream based on features in the user's environment, such as price tags, utterances, advertisements, and other features. In some embodiments, the prediction generation subsystem 114 may determine the units of the local currency that are to be used to generate a predicted equivalent price in a currency (e.g., a default currency, a user-select currency, etc.). For example, the prediction generation subsystem 114 may receive information related to the indicators extracted from the live video stream by the indicator extraction subsystem 116, and based on the information, makes determinations of the local currency and the units of the local currency that are being used in the environment based on the indicators, which may then be used to generate a predicted equivalent price by the prediction generation subsystem 114. In some embodiments, the generation of the determinations of the local currency and the units of the local currency may be based on information related to the local currency and units of the local currency in prediction databases 132.

In some embodiments, system 100 may generate a predicted price in a user-selected currency based on the units of a local currency and the local currency. For example, the prediction generation subsystem 114 may obtain information related to a currency conversion between the local currency and user-selected currency and based on the obtained information and the information related to units of the local currency and the local currency, determine the predicted price in the user-selected currency. In one use case, prediction generation subsystem 114 may receive information related to the local currency and the units of the local currency determined by the prediction generation subsystem 114, and based on that information, generate the predicted price in the user-selected currency based on a currency generation rate obtained by the prediction generation subsystem 114. In some embodiments, the generation of the price in the user-selected currency is based on information related to the local currency and units of the local currency in prediction databases 132. In some embodiments, the predicted price in the user-selected currency may be displayed by the device. Thus, in scenarios in which a device (and the user of the device) is located in a foreign country (e.g., in a location where product prices are reflected in a local currency unfamiliar to the user), a price in a currency local to the foreign country may be converted to a predicted equivalent price in a currency selected by the user of the device (e.g., the currency of the user's native country), based on the information gathered related to the local currency and the units of the local currency from the environment that the device is in. The user of the device would thus be provided with a predicted equivalent price in a familiar currency.

In some embodiments, system 100 may train or configure a prediction model to facilitate (1) the determination of the local currency or the units of the local currency, or (2) the generation of the predicted equivalent price in the user-selected currency. For example, the prediction generation subsystem 114 may obtain information related to features in the image and audio portions of a live video via the indicator extraction subsystem 116 extracting indicators from the live video stream. The prediction generation subsystem 114 may provide such information as input to a prediction model to generate predictions (e.g., related to indicators representative of a local currency or units of the local currency, corresponding to the features). In some embodiments, the predictions generated by the prediction model may be provided to the prediction generation subsystem 114 to determine a local currency and the units of the local currency. In a further example, the prediction generation subsystem 114 may obtain information related to indicators extracted from the image and audio portions of a live video and provide such information provided as input to a prediction model to generate predictions (e.g., related to the equivalent price in the user-selected currency, predicted based on the indicators). In some embodiments, the prediction generation subsystem 114 or the indicator extraction subsystem 116 may provide the information related to the features or the indicators as reference feedback to the prediction model, via feedback subsystem 118, and the prediction model may update one or more portions of the prediction model based on the predictions and the information related to the features or the indicators. As an example, the information may be related to indicators representative of units of a local currency and the local currency (e.g., information indicating context from the live video related to a price of a product in a local currency, etc.) and the prediction model may update the portion of the prediction model with respect to the prediction of the units of a local currency and the local currency. In this way, for example, the prediction model may be trained or configured to generate more accurate predictions of the local currency and the units of the local currency. In a further example, the information may be related to an equivalent price in the user-selected currency (e.g., a conversion of the units of the local currency to a predetermined currency via a conversion rate), and the prediction model may update the portion of the prediction model with respect to the prediction of the predicted equivalent price in the user-selected currency. In this way, for example, the prediction model may be trained or configured to generate more accurate predictions of the predicted equivalent price in the user-selected currency.

As such, in some embodiments, subsequent to the updating of the prediction model, the prediction generation subsystem 114 may perform a generation of the predicted equivalent price based on the predictions provided by the prediction model. As an example, the prediction generation subsystem 114 may use the predictions from the prediction model to determine a price in a local currency. As an example, the prediction generation subsystem 114 may obtain and provide information related to the local currency and units of the local currency to the prediction model to obtain one or more predictions from the prediction model. In one use case, the prediction generation subsystem 114 may generate a prediction specifying that the units of the local currency is X and the local currency is in Euros. Based on that prediction, the prediction generation subsystem 114 may generate a prediction of a predicted equivalent price in a user-selected currency that may be Y United States dollars.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
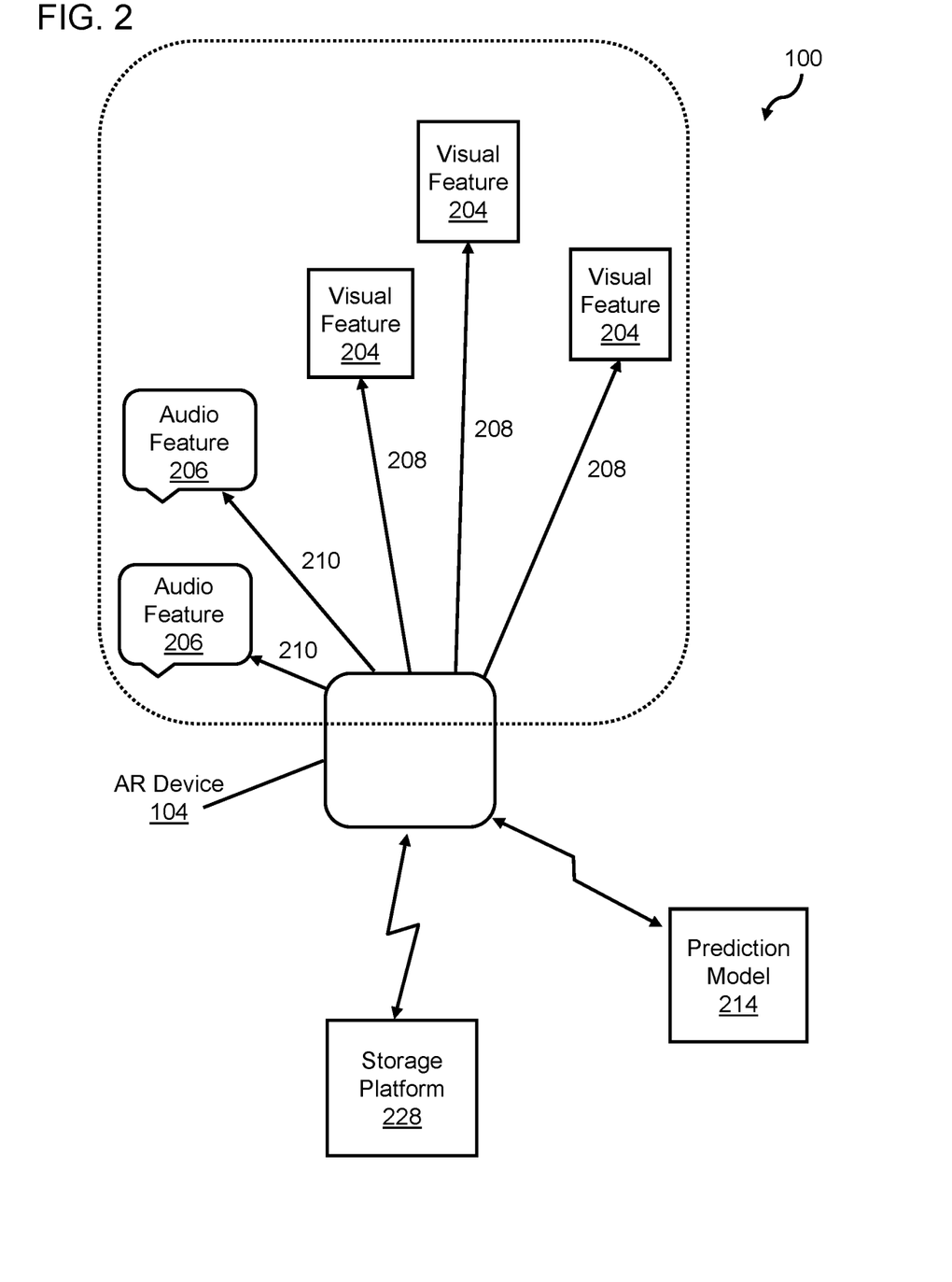
FIG. 2 shows a system that includes an augmented reality device, a prediction model, and components configured to facilitate currency conversion, in accordance with one or more embodiments.

As an example, with respect to FIG. 2, prediction model 214 may take inputs (e.g., visual features 204, audio features 206, or image-based and audio-based indicators corresponding to the visual features 204 or audio features 206) from the prediction generation subsystem 114 or the indicator extraction subsystem 116 and provide outputs (image-based or audio-based indicators or a predicted equivalent price in a user-selected currency) to the prediction generation subsystem 114. In one use case, outputs may be fed back to prediction model 214 as input to train machine prediction model 214 (e.g., alone or in conjunction with user indications of the accuracy of outputs, labels associated with the inputs, or with other reference feedback information). In another use case, prediction model 214 may update its configurations (e.g., weights, biases, or other parameters) based on its assessment of its prediction (e.g., outputs) and reference feedback information (e.g., user indication of accuracy, reference labels, or other information). In another use case, where prediction model 214 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model 214 may be trained to generate better predictions.

Figure 1B:
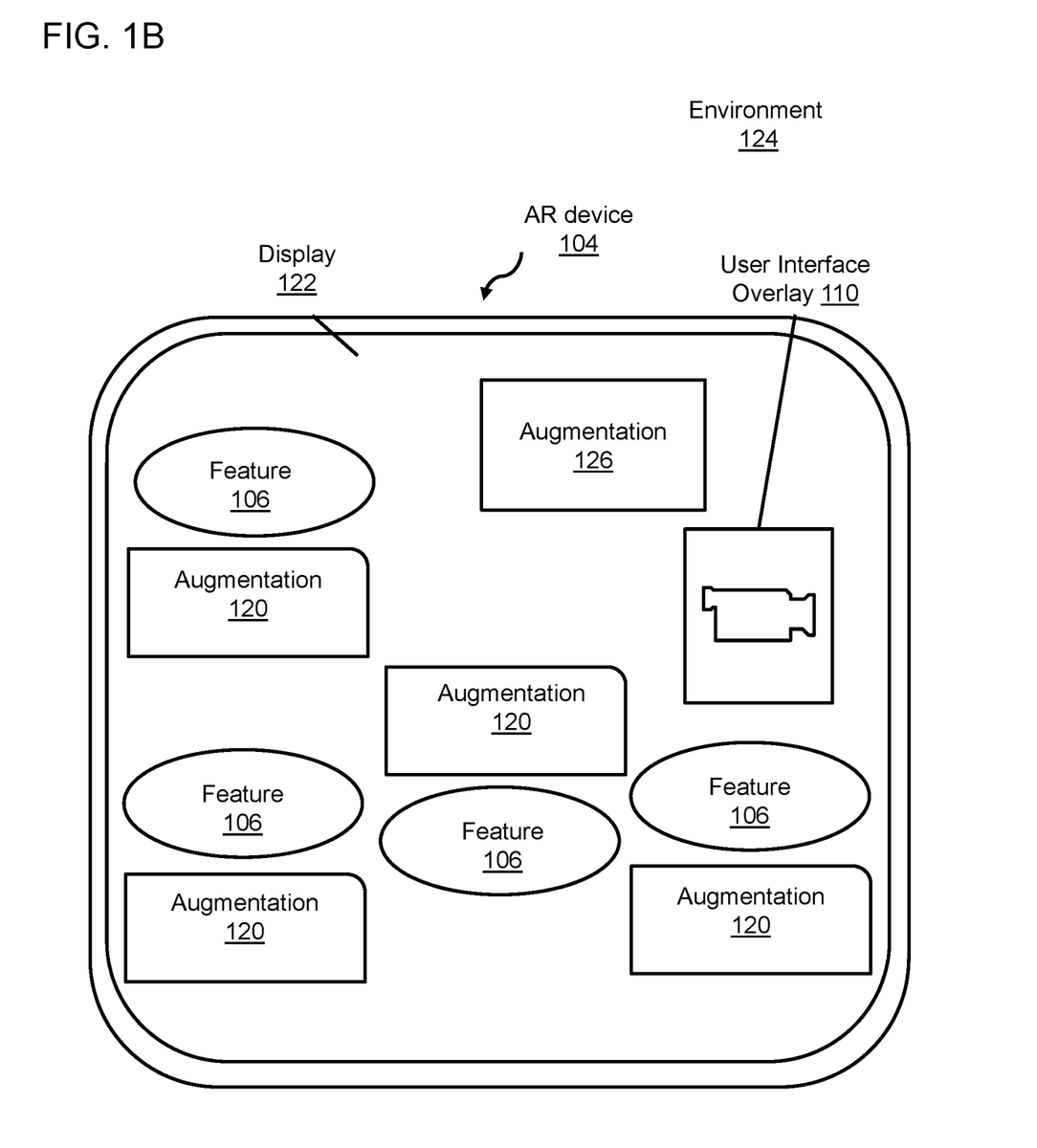
FIG. 1B shows a display of an augmented reality device configured to facilitate currency conversion and display a predicted price in a user-selected currency to a user of the wearable device, in accordance with one or more embodiments.

FIG. 1B shows an example of the display 122 of an augmented reality device (AR device) 104. In some embodiments, an environment 124 may be viewed, and a live video stream may be acquired and depicted to a user. In some embodiments, the live video stream may be depicted on the display 122. In some embodiments, a drone or remotely operated device may be configured to view the environment, acquire the live video stream, and transmit the live video stream to the display 122. The live video stream may be representative of the environment 124. For example, the environment 124 may be an environment that the device is located in—the environment 124 may be a retail store or marketplace located in a foreign country that utilizes a local currency with which the user is not accustomed.

In some embodiments, the live video stream depicted on the display 122 may include an image portion and an audio portion. As an example, the image portion of the live video stream may be depicted on the display 122 and may include features 106, for example, images of a product, a price tag, or a label on a product that are located in the environment 124. As a further example, the audio portion of the live video stream may be provided with microphones and/or speakers and may include oral communications with a merchant, a local language spoken within proximity of the user, and other audible sounds of the environment 124.

In some embodiments, the features 106 may be related to a currency that, for example, may be used as context to determine the units of a local currency and the local currency. For example, the audio portion of the live video stream may include audio that represents the units of the local currency as "X" and the image portion may include images that represents the local currency as being in "United States Dollars." In some embodiments, the audio portion may be used to determine the local currency and the units of the local currency without reliance on the image portion of the live video stream, or vice versa. For example, if the audio portion includes an oral communication from a merchant that a product "costs X Euros," the units of the local currency may be determined to be X and the local currency determined to be Euros without relying on any features 106 depicted to the user in the image portion of the live video stream. In a further example, if the image portion includes an advertisement that says "for sale for Z yen!," the units of the local currency may be determined to be Z and the local currency determined to be Z yen without relying on the audio portion of the live video stream In some embodiments, the features 106 of the live video stream may not be related to currency and may, for example, be used as context to determine units of a local currency and the local currency. For example, the features 106 may depict a particular language rather than a meaning that relates to a price or currency—the image portion of the live video stream may include a feature 106 that is an advertisement that is written in Traditional Chinese characters (used in Taiwan) and not Simplified Chinese characters (used in China), leading to the determination that the local currency is Taiwanese yuan, rather than Chinese yuan. In a further example, the image portion of the live video stream may include a feature 106 that is an advertisement that is written in Arabic script (used in Egypt) and Egyptian Arabic is spoken in the environment 124 as heard in the audio portion of the live video stream, which may lead to the determination that the units of local currency is Y and the local currency is Egyptian pounds.

In some embodiments, the predicted equivalent price is generated based on the units of a local currency and the local currency determined from the image portion and the audio portion of the live video stream. As an example, the video portion may include a feature that is a price tag that includes the price (e.g., "¥X"), and the audio portion may include a communication from the merchant that represents that the currency is a local currency (e.g., "yen"). In this way, for example, the units of the local currency (X) may be determined based on (i) the image portion of the live video stream and (ii) the local currency (Japanese yen) from the audio portion of the live video stream, that is being used in the environment 124 (e.g., store in Japan). In some embodiments, the units of the local currency may be converted from the local currency (X Japanese yen) to generate a predicted equivalent price (e.g., Y) in a user-selected currency (e.g., American dollars).

In some embodiments, the user of a client device 104 may use the user interface overlay 110 to choose the user-selected currency for generation of the predicted equivalent price, or settings for the currency conversion such as updating a currency conversion rate used for generating the predicted equivalent price in the user-selected currency. For example, the user interface overlay 110 may include a menu that is an overlay of the live video stream, with options that correspond to the features 106 depicted in the live video stream.

As shown in FIG. 1B, a display 122 may be a component of a device. A display 122 may depict features 106, augmentations 120 of predicted equivalent prices associated with the features 106, augmentation 126 of predicted equivalent prices not associated with the features 106, a user interface overlay 110, or other components. It should be noted that, although some embodiments are described herein with respect to augmentations 120/126 of text or images, other augmentations of the live video stream on the display 122 in real time may be implemented in lieu of or in addition to augmentations 120/126 of the predicted equivalent price in the user-selected currency, and by other components of the client device 104 other than the display 122.

In some embodiments, features 106 may be tracked in the image portion of the live video stream depicted on the display 122 and augmented in the live stream of the environment 124 on the display 122 by depicting a predicted equivalent price in a location that is close to the corresponding feature 106 on the display 122. For example, ¥X in Japanese yen may be converted to $Y in United States dollars for a feature 106 that is a price tag that represents "¥X." As the user moves the device around and different parts of the environment are viewed and become depicted on the display 122, where the price tag is depicted may be tracked and augmented with $Y in United States Dollars at any point in time that the price tag is still depicted on the display 122. In some embodiments, the feature 106 may be augmented by providing an augmentation 120 of the predicted equivalent price in text or images. In some embodiments, a predicted equivalent price not associated with the features 106 may be provided in the live video stream on the display 122 using augmentation 126 rather than 108, as there is no corresponding feature—for example, if the determination of the units of local currency and the local currency is based on the audio portion of the live video stream and not the image portion.

It should also be noted that, in some embodiments, one of either of the video portion or audio portion of the live video stream depicted on the display 122 may not be relied upon to determine the units of local currency and the local currency, for generating the predicted equivalent price. As an example, the predicted equivalent price may be determined without relying on either the image portion or the audio portion of the live video stream. In one use case, the image portion of the live video stream may include a visual feature 204 that is a price tag that depicts "X yen", which allows the determination that the units of local currency is X and the local currency is Japanese yen, without relying on the audio portion of the live video stream. In a further use case, the audio portion of the live video stream may include an audio feature 206 that is a statement from a merchant that indicates that the product is Y Euros, which allows the determination that the units of local currency is Y and the local currency is Euros, without relying on the image portion of the live video stream. In some embodiments, if the predicted equivalent price in the user-selected currency is determined solely based on the audio portion of the live video stream, the display 122 may depict the predicted equivalent price in an overlay 112 that is located independently from any feature 106 depicted on the display 122.

FIG. 2 shows a system 100 configured to facilitate currency conversion, in accordance with one or more embodiments. As shown in FIG. 2, a device may be located in and depicting an environment 124. For example, in FIG. 2, the system 100 may include an AR device 104, a prediction model 214, a storage platform 228, or other components.

By way of example, the device may be any device that performs the display and augmentation of the depiction of an environment 124 to a user of the device. In some embodiments, the depiction of the environment 124 may be a live video stream representative of the environment 124. In some embodiments, the device may be a headset, glasses, a mobile phone, a tablet, a terminal, a smartwatch, a display, or other user devices. In some embodiments, the device may include sensors that may be used to perform the detections 208/210 of the audio features 206 or the visual features 204 in the environment 124 that the device is obtaining a live video stream of In some embodiments, the device may be associated with transactions, which may include payments, deposits, or other activities related to currencies. For example, the device may be a mobile phone that a user may use to provide mobile payments for a product at a retailer that the user and the mobile phone are physically located at, through an application installed on the mobile phone.

In some embodiments, a live video stream may be obtained of the environment 124 and presented to the user of the device. For example, the live video stream may be the view of a user of the device. In a further example, the live video stream may be the monitoring of an environment 124 by a device that a user is operating remotely. In some embodiments, the environment 124 may be located at a retail store or a marketplace. In some embodiments, the environment 124 may be located in a foreign country.

The live video stream of the environment 124 may include an image portion and an audio portion. The image portion may include visual features 204 in the environment 124. For example, the visual features 204 may include price tags, advertisements, signs, merchant information, products, and other items that are present in the environment 124 and depicted in the live video. The audio portion may include audio features 206 in the environment 124 and depicted in the live video. For example, the audio features 206 may include verbal communications, the language spoken around the user, and other audible utterances or sounds that are present in the environment 124.

In some embodiments, the indicator extraction subsystem 116 performs the visual detection 208 of the visual features 204 in the environment 124 of the live video stream to extract an image-derived indicator in real time. In some embodiments, the visual detection 208 includes image recognition. In some embodiments, an image-derived indicator may represent units of a local currency, corresponding to the visual feature 204, and be used by the prediction generation subsystem 114 to determine units of the local currency. For example, image recognition may be performed on the live video to recognize a merchant advertisement depicted in the image portion of the live video stream that advertises a product as being "sold for the price of $X!" (a visual feature 204), to extract a numerical amount of "X" (the image-derived indicator) from the live video stream, where "X" represents units of a local currency. In some embodiments, the identity of objects in the environment 124 may be recognized. In some embodiments, an image-derived indicator may represent a local currency, corresponding to the visual feature 204, and be used by the prediction generation subsystem 114 to determine the local currency. For example, image recognition may be performed on the live video to recognize a landmark or a particular visual feature 204 that is associated with a region having a particular local currency. For example, image recognition may be performed on the live video to recognize the Eiffel tower as depicted in the image portion of the live video stream. A local currency of "Euros" (the image-derived indicator) may then be extracted from the live video stream, as Euros is associated with France. In a further example, a visual feature 204 may be signage in the environment that is associated with a region having a particular local currency. A local currency of "United States Dollars" (the image-derived indicator) may be extracted from a live video stream containing a visual feature 204 of a sign that states: "Welcome to Pennsylvania."

In some embodiments, the indicator extraction subsystem 116 performs the audio detection 210 of the audio features 206 in the environment 124 of the live video stream to extract an audio-derived indicator in real time. In some embodiments, the indicator extraction subsystem 116 may perform natural language processing to recognize words that, for example, represent a price or a currency, or recognize what language that audible speech is in. In some embodiments, an audio-derived indicator may represent a local currency, corresponding to the audio feature 206, that may be used by the prediction generation subsystem 114 to determine the local currency. For example, natural language processing may be performed on a statement made by a merchant that "This product costs X" in Japanese (an audio feature 206) depicted in the audio portion of the live video stream. Natural language processing may be performed on the statement to recognize that the language that the statement is in is Japanese, so as to extract a indicator that represents "Japanese yen" from the live video stream, where "Japanese yen" represents the local currency. In a further example, natural language processing may be performed on a statement made by a merchant that "this product costs X yen" (an audio feature 206) depicted in the audio portion of the live video stream. Natural language processing may be performed on the statement to recognize that the statement indicates "yen," so as to extract an indicator that represents "Japanese yen" from the live video stream, where "Japanese yen" represents the local currency.

In some embodiments, a predicted equivalent price in a user-selected currency is generated by the prediction generation subsystem 114, based on the image-derived indicators and the audio-derived indicators that were extracted from the live video stream. For example, if an image-derived indicator is "X" and represents units of a local currency and an audio-derived indicator is "Japanese yen" and represents the local currency, a price in a local currency may be determined to represent "X yen." The predicted equivalent price in the user-selected currency United States dollars may be generated by converting X yen to Y United States Dollars using a currency conversion rate.

It should be noted that, in some embodiments, the predicted equivalent price may be generated without relying on both the image-derived indicators and the audio-derived indicators. For example, the predicted equivalent price may be determined using either an image-derived indicator or an audio-derived indicator, if the indicator is sufficient to indicate the local currency and the units of the local currency. For example, if the visual feature is a price tag that indicates "X Japanese yen," the image-derived indicator may represent "X Japanese yen," representing both the local currency and the units of the local currency. In a further example, if the audio feature is a statement by a merchant that indicates that the product will cost "X Japanese yen," the audio-derived indicator may represent "X Japanese yen," representing both the local currency and the units of the local currency.

With respect to FIG. 2, the device may interact with a prediction model 214, or a storage platform 228, or other components of system 100. In some embodiments, the system 100 illustrated in FIG. 2 may include one or more devices that are programmed to perform the functions described herein. The system 100 may include one or more electronic storages, one or more physical processors programmed with one or more computer program instructions, one or more servers, and/or other components (e.g., a storage platform 228). The system 100 may include communication lines or ports to enable the exchange of information within a network (e.g., 150) or other computing platforms via wired or wireless techniques (e.g., Ethernet, fiber optics, coaxial cable, Wi-Fi, Bluetooth, near field communication, or other technologies). The system 100 may include a plurality of hardware, software, and/or firmware components operating together. For example, the prediction model 214 may be implemented by a cloud of computing platforms operating together.

In some embodiments, the system 100 may include a prediction model 214. For example, the prediction model 214 may receive information and provide predictions to the subsystems, for the subsystems to generate determinations. In some embodiments, the prediction model 214 may provide predictions to the prediction generation subsystem 114, to determine a local currency and units of the local currency. In some embodiments, the prediction model 214 may provide predictions to the prediction generation subsystem 114, to generate a predicted price in a user-selected currency. The interactions between the device and the subsystems may be two-sided, with transmittal and receipt of data. In some embodiments, the device may transmit the live video stream to the indicator extraction subsystem 116 to extract imaged-derived or audio-derived indicators from, as previously mentioned. For example, the prediction generation subsystem 114 may determine the units of local currency (e.g., X) and the local currency (e.g., Euros), based on the live video stream, or based on the indicator extraction subsystem 116 conducting processing activities like image recognition or natural language processing of the live video stream to obtain the indicators. In some embodiments, the prediction generation subsystem 114 may generate the predicted equivalent price in the user-selected currency based on the indicators. For example, the prediction generation subsystem 114 may convert the units in the local currency (e.g., X euros), based on the information determined by the prediction generation subsystem 114, to the predicted equivalent price in the user-selected currency (e.g., Y United States dollars). In some embodiments, the indicator extraction subsystem 116 may transmit the indicators to the prediction generation subsystem 114 to generate a predicted equivalent price in a user-selected currency, based on the indicators, without the prediction generation subsystem 114 as an intermediary.

In some embodiments, the prediction generation subsystem 114 may engage in the determination of the price in the local currency, based on the units of local currency or the local currency based on the live video stream. For example, the indicator extraction subsystem 116 may extract "X" (the image-derived indicator representing units of local currency) from an image of a price tag (the visual feature 204 from the image portion of the live video stream) and "Taiwanese yuan" (the image-derived indicator representing the local currency) from an oral communication from a merchant (an audio feature 206 from the audio portion of the live video stream). Based on that information, the prediction generation subsystem 114 may determine a price in the local currency of X Taiwanese Yuan. In some embodiments, as previously described above, the prediction generation subsystem 114 may directly extract indicators from the live video stream or directly determine the units of local currency or the local currency, without the indicator extraction subsystem 116 as an intermediary. In some embodiments, another component of the system 100 may extract the indicators from the live video stream or determine the units of local currency or the local currency.

In some embodiments, the prediction generation subsystem 114 may generate a predicted equivalent price, based on the determination of the price in the local currency from the units of local currency or the local currency. For example, based on the determination that the units of local currency is X and the local currency is Indian rupees, the prediction generation subsystem 114 may generate a predicted equivalent price of Y in a user-selected currency, such as United States dollars, by converting the price in the local currency, X Indian Rupees, to Y United States dollars. In some embodiments, the conversion is performed using a user-selected currency that is predefined by the user using the user interface overlay 110. For example, a user of a device may have predefined the user-selected currency to be United States dollars and, based on the determination that the units of local currency is $X and the local currency is Indian Rupees, the prediction generation subsystem 114 may generate a predicted equivalent price of $Y in the user-selected currency of United States dollars. In some embodiments, as previously described above, the device may directly generate the predicted equivalent price based on the determination of the units of local currency or the local currency, without the prediction generation subsystem 114 conducting the generation. In some embodiments, another component of the system 100 may directly generate the predicted equivalent price.

In some embodiments, instead of relying on the indicators extracted from the live video to determine the local currency, the system 100 may rely on the location of the device as an indicator. For example, the system may determine the location of the device, and use the location in order to determine that the local currency is a particular currency associated with the particular location, or send a command to the prediction generation subsystem 114 to generate the predicted equivalent price based on the local currency being a particular currency associated with the particular location. For example, as a local currency of Euros is associated with Germany, a determination that the location of the device is in Berlin may lead to a determination that the local currency is in Euros by the prediction generation subsystem 114, which in turn transmits the information to the prediction generation subsystem 114 without relying on information from the indicator extraction subsystem 116. In some embodiments, the location of the device may be relied upon along with the image-derived and audio-derived indicators extracted from the live video to determine the local currency. For example, from the location of the device being in Ottawa, Canada and a feature that is an advertisement that represents that the price is in "dollars," the system 100 may determine that the local currency is Canadian Dollars.

In some embodiments, the system 100 may include a storage platform 228 (e.g., a remote server or other server with which the device interacts). For example, the storage platform can be used to store indicators or live video streams, or information related to the environment. In some embodiments, the storage platform 222 may transmit past indicators obtained from past image portions and audio portions of the live video stream and stored in the storage platform 222 to the device. In some embodiments, the past indicators have been derived from image portions and audio portions of the live video stream occurring from one to five minutes in the past.

In some embodiments, the past indicators have been derived from stored indicators from past live video streams. As an example, the storage platform 222 may provide past indicators, to determine that the local currency is the particular currency that had been associated with the past indicators, or send a command to the prediction generation subsystem 114 to generate the predicted equivalent price based on the local currency being the particular currency associated with the past indicators. In some embodiments, the device itself or other components like the prediction database(s) 132 may have storage capabilities and may store and obtain the past indicators without the storage platform 222 as an intermediary.

In some embodiments, the storage platform 222 may provide past indicators to ensure that currently extracted indicators that represent currently determined units of the local currency associated with a specific feature are reasonable, in comparison to past indicators associated with the same specific feature. For example, an indicator representing X Euros may be extracted from the live video stream, that is associated with a feature of a price tag of X euros on a product A. The storage platform 222 may provide a past indicator representing Y Euros, that had been extracted from a past live video stream and was associated with a feature of a price tag of Y Euros on the same product A, where Y is a significantly greater value than X. This may indicate that the determined units of local currency from the currently extracted indicator for product A (X) is not reasonable given the past determined Y. By extension, the predicted equivalent price for product A may be not reasonable. In some embodiments, the storage platform 222 may similarly provide stored past predicted equivalent prices to ensure that the currently predicted price is reasonable associated with a specific feature, compared to the stored past predicted equivalent prices associated with the same specific feature. In some embodiments, a warning may be provided to the user of the device based on any unreasonableness. In some embodiments, whether specific features are the same may be determined based on the location of the device.

In some embodiments, the storage platform 228 may store past locations of the device and use the stored locations to verify the determination of the local currency. For example, a stored past location indicating that the device had been used in the United States may be used to verify that the local currency is United States, based on an image-based indicator representing that "X Dollars."

In some embodiments, along with or instead of augmenting the live video stream, an application in which units of the local currency and the local currency are depicted or used may be augmented with the predicted equivalent price. In some embodiments, the application may be augmented in the same manner as the augmentations 120/126, as previously described. In some embodiments, the augmentations are performed by augmenting the live video stream with predicted prices generated by the prediction generation subsystem 114. In some embodiments, the application may be an application related to point of sale system or a transaction system. In some embodiments, the application may be installed on the device. In some embodiments, after the predicted equivalent price is generated, the predicted equivalent price may be provided to the application. For example, the predicted equivalent price may be generated by the prediction generation subsystem 114, as previously described, and then provided to the application by the prediction generation subsystem 114. In some embodiments, the predicted equivalent price may be directly determined by the application, rather than the prediction generation subsystem 114. For example, the application may use information related to the local currency or the units of the local currency from the prediction generation subsystem 114 directly to generate a predicted equivalent price. The application in turn may use the predicted equivalent price instead of the price in the local currency when carrying out its operations. For example, when checking out via the application, a local price of a product in the local currency may not be used in the application, and the predicted equivalent price in the user-selected currency may instead be used in the application. In some embodiments, the augmentation of the application may be an overlay depicting the predicted equivalent price via techniques that are similar to those described with respect to producing the augmentations 120/126 of the predicted equivalent price on the live video stream depicted on the display 122 in FIG. 1. In some embodiments, the augmentation of the application may be a replacement of text or images that correspond to the parts of a user interface or depiction of the application that include the units of local currency and the local currency. For example, where the application platform depicts Y Euros (e.g., the price in the local currency), $X United States Dollars (e.g., the predicted equivalent price in the user-selected currency) may be depicted.

In some embodiments, the application may be a banking application. In some embodiments, the banking application may be provided with the predicted equivalent price in a transaction. For example, the application may receive a preliminary charge of X Euros, the predicted equivalent price. The predicted equivalent price may be based on an extracted indicator representing "Y Canadian Dollars," that is associated with a feature that is a price tag that says "$Y" and is attached to a product A. In some embodiments, the application may receive data or communicate with the storage platform 222. For example, the application may receive a stored predicted equivalent price of Z Euros, that is based on a stored past indicator representing "W Canadian Dollars." The stored past indicator may be associated with a feature that is an advertisement that states that the same product A is on sale for "$W." In some embodiments, the predicted equivalent prices are compared to determine whether the currently predicted equivalent price is reasonable. For example, if the predicted equivalent price of X Euros is significantly greater than the stored predicted equivalent price of Z Euros (or the indicator representing Y Canadian Dollars is significantly greater than the stored past indicator of W Canadian dollars) for the same product A, the difference between the current predicted price and the past predicted price may be determined to be unreasonable. In some embodiments, the banking application may take actions based on the difference. For example, the banking application may decline the transaction, or if such a difference does not exist or is below a particular threshold, approve the transaction. In some embodiments, the banking application may use the location that the device is located at to determine whether the features for which the predicted equivalent prices are being compared are the same. For example, product A in a current location of Germany and product A in a past location of China may not be the same feature, for purposes of determining whether a predicted equivalent price of product A is reasonable compared to a stored past predicted equivalent price of product A.

Figure 3:
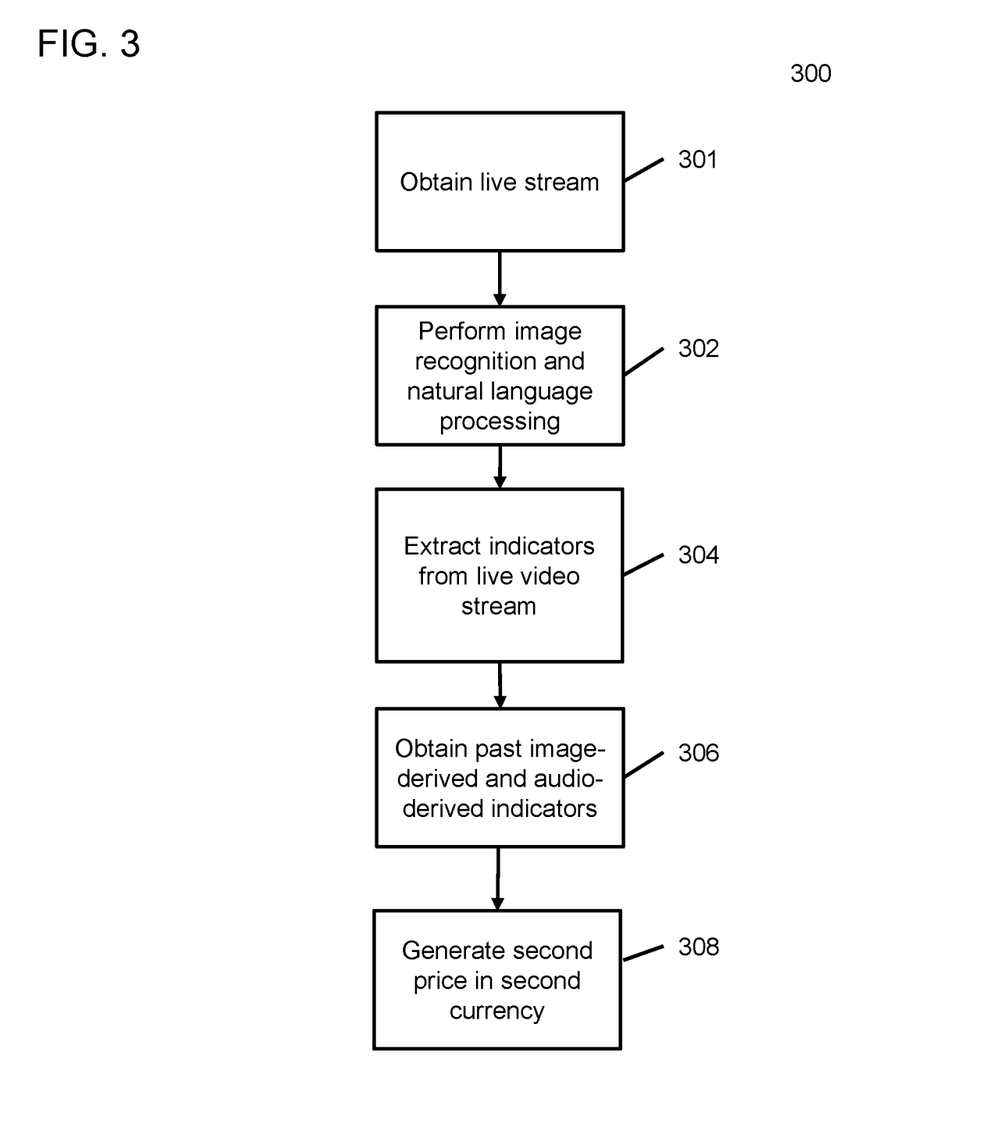
FIG. 3 shows a flowchart of a method that facilitates currency conversion from a first price in a first currency to a second price in a second currency.

FIG. 3 shows an example flowchart 300 of processing operations of a method that facilitates currency conversion from a first price in a first currency to a second price in a second currency, in accordance with one or more embodiments. The processing operations of the method presented in FIG. 3 is intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, at 301, a live video stream is obtained via a device, and the display 122 of the device begins to provide the user with the live video stream of the environment 124. In some embodiments, the live video stream may include an image portion and an audio portion.

In some embodiments, at 302, image recognition and natural language processing are performed on the image portion and audio portion of the live video stream, to recognize visual features 204 or audio features 206 that are present in the environment 124 and that are depicted in the live video stream on the display 122 or heard in the environment 124. For example, the visual features 204 may be: a price tag, an advertisement, merchant information regarding products, or objects. In some embodiments, the visual features 204 may be determined based on predetermined settings of the user, such as the user associating a particular type of object (e.g., a price tag) with a visual feature 204. In a further example, the audio features 206 may be oral communications, a language spoken in the environment, audible utterances, or other sounds. In some embodiments, the audio features 206 may be determined based on predetermined settings of the user, such as the user associating particular audible words (e.g., "cost," "price," etc.) with an audio feature 206.

In some embodiments, at 304, indicators may be extracted from the live video stream, that are representative of units in the first currency and a first currency. In some embodiments, the first currency is a local currency. In some embodiments, the indicators may be extracted from the image portion of the live video stream, such as from visual features 204 in the environment 124. For example, a visual feature 204 may be a price tag (e.g., representing "Y"), and the indicator extracted may be an image-derived indicator that represents units of the first currency (e.g., Y) or a first currency (e.g., Japanese yen). In some embodiments, the indicators may be extracted from the audio portion of the live video stream, such as from audio features 206 in the environment 124. For example, an audio feature 206 may be an oral communication from a vendor of a product (e.g., a statement that "this costs X Canadian dollars"), and the indicator extracted may be an audio-derived indicator that represents units of a first currency (X) or a first currency (e.g., Canadian dollars).

In some embodiments, at 306, past image-derived indicators and audio-derived indicators may be obtained and transferred wirelessly from a storage platform 228. In some embodiments, the storage platform 228 transfers or receives data from the indicator extraction subsystem (e.g., to store past indicators) or the prediction generation subsystem 114 (e.g., to store past local currencies and units of local currencies determined) or the prediction generation subsystem 114 (e.g., to store past generations of predicted prices in user-selected currencies). As an example, the past-image derived indicators and audio-derived indicators may have been extracted from the image portions and the audio portions of live video stream in the past, and then stored in the storage platform 228. In some embodiments, the storage platform 228 may store past live video streams and indicators associated with the past live video streams. In some embodiments, the past image-derived indicators and audio-derived indicators represent the units in the first currency and the first currency. For example, past-image derived indicators and audio-derived indicators may have been extracted from the live video stream from a time period such as the past five minutes, and represent a first price of X and a first currency of Euros. In some embodiments, the past image-derived indicators and audio-derived indicators may be used during the generation of the second price in the second currency with the image-derived indicators and the audio-derived indicators extracted from the live video stream.

In some embodiments, an indicator may be an indicator that is not an image-derived indicator or audio-derived indicator extracted from the live video stream. For example, an indicator may represent the location of the device, which may be determined without relying on the live video stream. The location may be used to determine the first currency, similarly to the image-based indicators and the audio-based indicators. As an example, if the location of the device is determined to be in Munich, Germany, a location-derived indicator may be determined that represents "Euros." In some embodiments, the location-derived indicator may be relied on to generate the second price in the second currency along with the image-derived indicators and the audio-derived indicators extracted from the live video stream. In some embodiments, the location-derived indicator may be relied on during the generation of the second price in the second currency along with the past image-derived indicators and the audio-derived indicators extracted from the live video stream. In some embodiments, the indicators may be checked against each other for accuracy. In some embodiments the indicator extraction subsystem 116 performs a check that the indicators are consistent with each other. For example, if an indicator indicates that the local currency is Congolese Francs but other indicators indicate that the local currency is Saudi Arabian Riyals or the location indicator indicates a location of Saudi Arabia, the local currency may be determined to be Riyals. In some embodiments, if the indicators are conflicting with respect to the same feature, the conflicting indicators are depicted on the device and multiple first prices in potential first currencies and second prices may be generated for each conflicting indicator and provided to the user of the device. For example, one indicator may indicate that the local currency is in Moldovan Leus and another indicator may indicate that the local currency is in Bulgarian Levs. Based on the two indicators, two determinations may be made, of a first price in Moldovan Leus of X Leus and the first price in Bulgarian Levs of Y Levs. In some embodiments, past stored locations or past stored indicators, as previously discussed, may be used to resolve what determination of a local currency is correct. For example, a first indicator may indicate that the local currency is in United States Dollars, and a second indicator may indicate that the local currency is in Canadian Dollars. A previously stored location of the device from five minutes in the past may be of New York, or a past indicator may represent "United States dollars" due to a past visual feature in the live video being a sign stating "Welcome to the New York State Fair." It may then be confirmed that the first indicator and not the second indicator would be the correct one to base the determination of the local currency on, and that the local currency is United States Dollars rather than Canadian Dollars.

In some embodiments, at 308, the second price in the second currency is generated based on the first price in the first currency as determined from the indicators from the live video stream, past live video stream, and location that are representative of the units of the first currency or the first currency. In some embodiments, the second currency is a user-selected currency. In some embodiments, the second price in the second currency is generated using a currency conversion rate. For example, if the indicators indicate that the units of the first currency is X and the first currency is Euros, the first price in the first currency is X Euros, which may be converted to a second price in the second currency of Y American dollars based on a Euros-to-United-States-Dollars currency conversion rate. In some embodiments, if the indicators were conflicting with respect to the same feature, multiple potential second prices in the second currency may be generated with respect to each potential first currency. For example, if it was determined that a first price in Moldovan Leus may represent X Leus and another first price in Bulgarian Levs may represent Y Levs for the same feature, a price tag in the live video stream, there may be two second prices in the second currency that are generated based on each first price and depicted in the live video stream. In some embodiments, the user of the device determines or selects which of the generated second prices in the second currency is correct for that feature.

Figure 4:
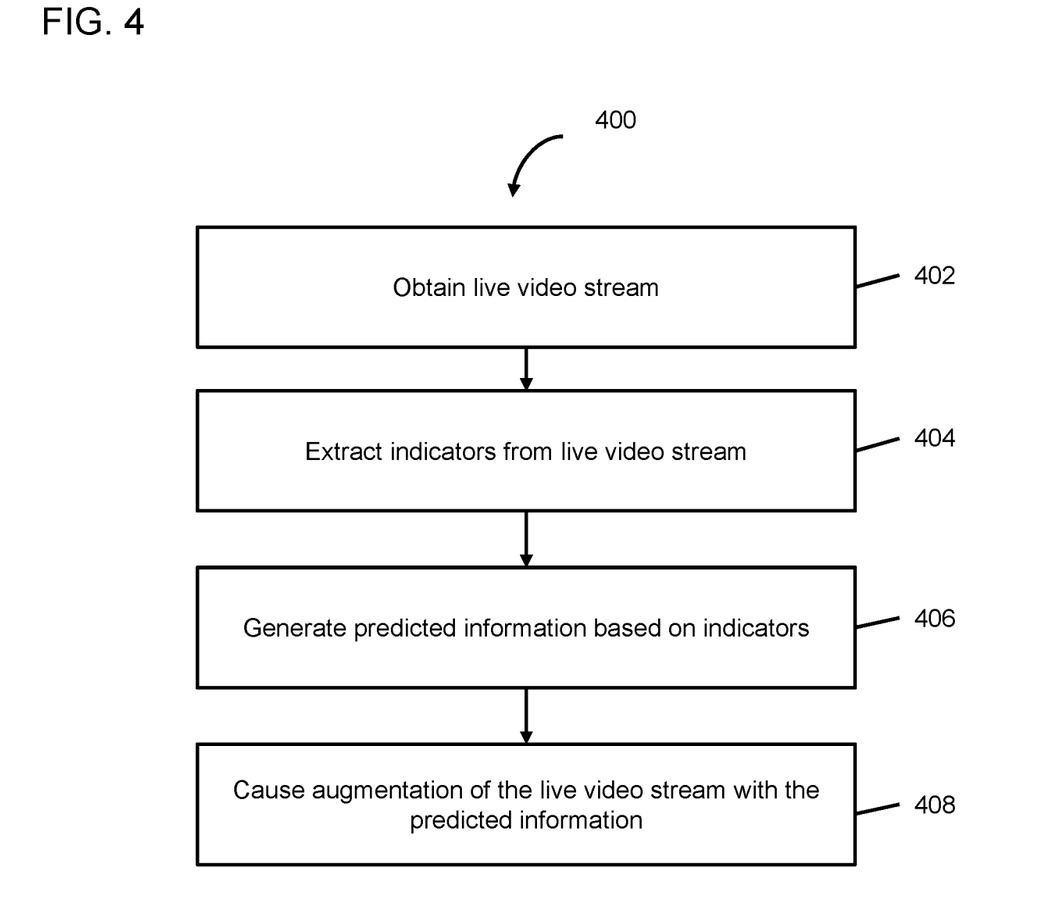
FIG. 4 shows a flowchart of a method of facilitating currency conversion, in accordance with one or more embodiments.

FIG. 4 shows an example flowchart of processing operations of a method 400 for facilitating augmentation of a live video stream representative of an environment with predicted information corresponding to features in the environment, in accordance with one or more embodiments. The processing operations of the method presented in FIG. 4 are intended to be illustrative and non-limiting. In some embodiments, the methods may be accomplished with one or more additional operations not described, and/or without one or more of the operations discussed. Additionally, the order in which the processing operations are illustrated (and described below) is not intended to be limiting.

In an operation 402, a live video stream representative of an environment may be obtained. As an example, the live video stream may include images or audio that are representative of features in the environment. The live video stream may be provided to a user viewing the environment. For example, the live video stream may be depicted on a display for the user. Operation 402 may be performed by a system that is the same as or similar to the system 100, in accordance with one or more embodiments.

In an operation 404, indicators may be extracted from the live video stream. In some embodiments, the indicators may be extracted based on images or audio in the live video stream, via image recognition or natural language processing. By way of example, the images of the live video stream may be images of an advertisement, a price tag, or an object. In a further example, the audio of the live video stream may include an utterance in the environment. In some embodiments, the indicators may correspond to features in the environment, for example, a currency or units of the currency. For example, an indicator representing X units of a local currency may be extracted from an audio of a merchant statement that "This product costs X." In a further example, an indicator representing a local currency of Mexican pesos may be extracted from an image of a price tag indicating a symbol for pesos. In some embodiments, multiple indicators may be extracted from the images or audio of the live video stream. Operation 404 may be performed by a component that is the same as or similar to the indicator extraction subsystem 116 or the prediction generation subsystem 114, in accordance with one or more embodiments.

In an operation 406, predicted information may be generated based on the indicators extracted from the live video stream. In some embodiments, the predicted information may represent a predicted equivalent price in a user-determined currency. For example, the indicators may represent a local currency or units of the local currency, and the predicted equivalent price may be determined by converting the units in the local currency to the predicted equivalent price in the user-selected currency, using a currency conversion rate. Operation 404 may be performed by a component that is the same as or similar to the prediction generation subsystem 114, in accordance with one or more embodiments.

In an operation 408, the live video stream is augmented with the predicted information. For example, the predicted information may represent the predicted equivalent price in the user-selected currency, and the determined predicted equivalent price in the user-selected currency may be displayed in the images of the live video stream, with an overlay depicting the determined predicted equivalent price with text or images. In some embodiments, the augmentation of the live video stream with the predicted information is based on tracking the location of the feature in the live video stream that corresponds to an indicator. For example, an image of a price tag in the live video stream may be augmented by an overlay depicting the predicted equivalent price, located near the location where the image of the price tag is in the live video stream. In the same example, as the live video stream changes and the location of the image in the live video stream correspondingly changes, the augmentation with the predicted equivalent price continually changes to be located near where the image has changed to be in the live video stream. Operation 408 may be performed by a device that is the same or similar to a client device 104, in accordance with one or more embodiments. Operation 408 may also be performed by a system that is the same as or similar to the prediction generation subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 114-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 114-118 described herein is for illustrative purposes, and is not intended to be limiting, as any of subsystems 114-118 may provide more or less functionality than is described. For example, one or more of subsystems 114-118 may be eliminated, and some or all of its functionality may be provided by other ones of subsystems 114-118. As another example, additional subsystems may be programmed to perform some or all of the functionality attributed herein to one of subsystems 114-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: determining a first price in a first currency; generating, based on the first price in the first currency, a second price in a second currency; and displaying the second price in the second currency on a device.
2. The method of embodiment 1, wherein the device may comprise a wearable device, a mobile device, or other user devices.
3. The method of any of embodiments 1-2, wherein the device acquires a live video stream of an environment in which the device is located in and viewing.
4. The method of any of embodiments 1-3, wherein the determining of the first price in the first currency comprises determining a local currency and units of the local currency from the live video stream, based on the live video stream.
5. The method of any of embodiments 1-4, wherein the generating of the second price in the second currency comprises generating a predicted equivalent price in a user-selected currency, based on units of the local currency and a local currency determined from the live video stream.
6. The method of any of embodiments 1-5, wherein the environment depicted in the live video stream comprises features, the features being continuously tracked by the device.
7. The method of any of embodiments 1-6, wherein the features comprise a visual feature or audio feature depicted in the live video stream, the live video stream comprising image and audio portions.
8. The method of any of embodiments 1-7, wherein the visual feature or audio feature may include a number, a symbol, a price tag, a product, an advertisement, an object, or an utterance.
9. The method of any of embodiments 1-8, wherein the features are related to a local currency and units of the local currency.
10. The method of any of embodiments 1-9, wherein indicators are extracted from the live video stream, the indicators being representative of a local currency and units of the local currency and corresponding to the features in the live video stream.
11. The method of any of embodiments 1-10, wherein the determining of the first price in the first currency is based on the indicators extracted from the live video stream that are representative of a local currency and units of the local currency.
12. The method of any of embodiments 1-11, wherein the determination of the first price in the first currency is based on indicators that are representative of the units of a local currency and the local currency, and that are not extracted from the live video stream, comprising a location of the device or indicators extracted from past live video streams.
13. The method of any of embodiments 1-12, wherein the local currency and units of the local currency comprise a price of a product or a currency depicted in the live video stream of the environment.
14. The method of any of embodiments 1-13, wherein the first price in the first currency may be determined without reliance on the image-derived indicators or the audio-derived indicators extracted from the live video stream.
15. The method of any of embodiments 1-14, wherein the generating of the second price in the second currency comprises using a currency conversion rate to convert the first price in the first currency to the second price in the second currency.
16. The method of any of embodiments 1-15, wherein the currency conversion rate relates to the first price in the first currency and the second price in the second currency.
17. The method of any of embodiments 1-16, wherein the second currency is selected by a user of the device.
18. The method of any of embodiments 1-17, wherein the determining of the first price in the first currency is performed with a prediction model.
19. The method of any of embodiments 1-18, wherein the generating of the second price in the second currency is performed with a prediction model.
20. The method of any of embodiments 1-19, wherein the displaying of the second price in the second currency comprises augmenting the live video with the second price in the second currency.
21. The method of any of embodiments 1-20, wherein the augmenting of the live video with the second price in the second currency comprises depicting the second price in the second currency in a location in the live video stream that is proximate the location of the corresponding feature in the live video stream.
22. The method of any of embodiments 1-21, wherein the features in the live video stream or the indicators extracted from the live video stream do not relate to prices or currencies.
23. A tangible, non-transitory, machine-readable media storing instructions that, when executed by an apparatus, cause the apparatus to effectuate operations comprising those of any of embodiments 1-22.
24. A system comprising: one or more processors; and memory storing instructions that, when executed by the processors, cause the processors to effectuate operations comprising those of any of embodiments 1-22.
25. An apparatus (e.g., an augmented reality device) that performs the operations of any of embodiments 1-22.

What is claimed is:

1. An augmented reality system for facilitating currency conversion, comprising:
one or more processors programmed with instructions that, when executed, cause the augmented reality system to:
obtain, via a wearable device, a live video stream of an environment at which the wearable device is located, the live video stream comprising an image portion and an audio portion that are representative of the environment;
perform image recognition on the image portion of the live video stream to extract an image-derived indicator in real time from the image portion of the live video stream, wherein the image-derived indicator represents a quantity of units of a local currency that correspond to a feature in the image portion of the live video stream;

continuously track the corresponding feature in the live video stream;

perform natural language processing on the audio portion of the live video stream to extract the audio-derived indicator in real time from the audio portion of the live video stream, wherein the audio-derived indicator represents the local currency;

generate, via a neural network, a predicted equivalent price in a user-selected currency based on (i) the image-derived indicator from the live video stream and (ii) the audio-derived indicator from the live video stream, the predicted equivalent price corresponding to the quantity of the units of the local currency; and cause, based on the continuous tracking of the corresponding feature, augmentation of the corresponding feature with the predicted equivalent price in the live video stream such that the predicted equivalent price of the user-selected currency is displayed proximate the corresponding feature in the live video stream.

2. The augmented reality system of claim 1, wherein the wearable device comprises a headset or glasses.

3. The augmented reality system of claim 1, wherein the corresponding feature comprises a number, a symbol, a price tag, a product, an advertisement, or an object in the live video stream.

4. The augmented reality system of claim 1, wherein the augmented reality system is caused to:

obtain past image-derived indicators derived from past image portions of the live video stream, wherein generating the predicted equivalent price in the user-selected currency comprises generating, via the neural network, the predicted equivalent price in the user-selected currency based on (i) the image-derived indicator from the live video stream, (ii) the audio-derived indicator from the live video stream, and (iii) the past image-derived indicators from the live video stream.

5. The augmented reality system of claim 1, wherein the augmented reality system is caused to:

obtain past audio-derived indicators derived from past audio portions of the live video stream, wherein generating the predicted equivalent price in the user-selected currency comprises generating, via the neural network, the predicted equivalent price in the user-selected currency based on (i) the image-derived indicator from the live video stream, (ii) the audio-derived indicator from the live video stream, and (iii) the past audio-derived indicators from the live video stream.

6. The augmented reality system of claim 1, wherein the augmented reality system is caused to:

obtain a location of the wearable device, wherein generating the predicted equivalent price in the user-selected currency comprises generating, via the neural network, the predicted equivalent price in the user-selected currency based on (i) the image-derived indicator from the live video stream, (ii) the audio-derived indicator from the live video stream, and (iii) the location of the wearable device.

7. A method comprising:

obtaining, by one or more processors, a live video stream of an environment, the live video stream comprising an image portion and an audio portion that are representative of the environment;

determining, by one or more processors, from the image portion of the live video stream, an image-derived indicator representing at least one of a currency or a quantity of units of the currency;

determining, by one or more processors, from the audio portion of the live video stream, an audio-derived indicator representing at least one of the currency or the quantity of the units of the currency;

generating, by one or more processors, a predicted equivalent price in a user-selected currency based on (i) the image-derived indicator from the live video stream and (ii) the audio-derived indicator from the live video stream, the predicted equivalent price corresponding to the quantity of the units of the currency; and causing, by one or more processors, augmentation of a feature in the live video stream with the predicted equivalent price, the feature corresponding to the image-derived indicator or the audio-derived indicator.

8. The method of claim 7, further comprising:

continuously tracking, by one or more processors, the corresponding feature in the live video stream, wherein causing, based on the continuous tracking of the corresponding feature, the augmentation of the corresponding feature with the predicted equivalent price in the live video stream such that the predicted equivalent price is displayed proximate the corresponding feature in the live video stream.

9. The method of claim 7, further comprising:

obtaining, by one or more processors, past image-derived indicators derived from past image portions of the live video stream, wherein generating the predicted equivalent price in the user-selected currency comprises generating the predicted equivalent price in the user-selected currency based on (i) the image-derived indicator from the live video stream, (ii) the audio-derived indicator from the live video stream, and (iii) the past image-derived indicators from the live video stream.

10. The method of claim 7, further comprising:

obtaining, by one or more processors, past audio-derived indicators derived from past audio portions of the live video stream, wherein generating the predicted equivalent price in the user-selected currency comprises generating the predicted equivalent price in the user-selected currency based on (i) the image-derived indicator from the live video stream, (ii) the audio-derived indicator from the live video stream, and (iii) the past audio-derived indicators from the live video stream.

11. The method of claim 7, further comprising:

determining, by one or more processors, an image-derived non-currency indicator from the image portion of the live video stream; and determining, by one or more processors, an audio-derived non-currency indicator from the audio portion of the live video stream, wherein generating the predicted equivalent price in the user-selected currency comprises generating the predicted equivalent price in the user-selected currency based on (i) the image-derived indicator from the live video stream, (ii) the audio-derived indicator from the live video stream, (iii) the image-derived non-currency indicator from the live video stream, and (iv) the audio-derived non-currency indicator from the live video stream.

12. The method of claim 7, further comprising:
obtaining, by one or more processors, a location of a user, wherein generating the predicted equivalent price in the user-selected currency comprises generating the predicted equivalent price in the user-selected currency based on (i) the image-derived indicator from the live video stream, (ii) the audio-derived indicator from the live video stream, and (iii) the location of the user.

13. The method of claim 7, wherein the corresponding feature comprises a number, a symbol, a price tag, a product, an advertisement, an object, or an utterance in the live video stream.

14. The method of claim 7, further comprising:
performing, by one or more processors, image recognition of the image portion of the live video stream to determine the image-derived indicator from the live video stream; and
performing, by one or more processors, natural language processing of the audio portion of the live video stream to determine the audio-derived indicator from the live video stream.

15. A non-transitory computer-readable media comprising instructions that, when executed by one or more processors, cause operations comprising:
obtaining a live video stream of an environment, the live video stream comprising an image portion and an audio portion that are representative of the environment;
determining, from the image portion of the live video stream, an image-derived indicator representing at least one of a currency or a quantity of units of the currency;
determining, from the audio portion of the live video stream, an audio-derived indicator representing at least one of the currency or the quantity of the units of the currency;
generating a predicted equivalent price in a user-selected currency based on (i) the image-derived indicator from the live video stream and (ii) the audio-derived indicator from the live video stream, the predicted equivalent price corresponding to the quantity of the units of the currency; and
causing augmentation of a feature in the live video stream with the predicted equivalent price, the feature corresponding to the image-derived indicator or the audio-derived indicator.

16. The non-transitory computer-readable media of claim 15, the operations further comprising:
continuously tracking the corresponding feature in the live video stream,
wherein causing, based on the continuous tracking of the corresponding feature, the augmentation of the corresponding feature with the predicted equivalent price in the live video stream such that the predicted equivalent price is displayed proximate the corresponding feature in the live video stream.

17. The non-transitory computer-readable media of claim 15, the operations further comprising:
obtaining past image-derived indicators or past audio-derived indicators derived from past image or past audio portions of the live video stream,
wherein generating the predicted equivalent price in the user-selected currency comprises generating the predicted equivalent price in the user-selected currency based on (i) the image-derived indicator from the live video stream, (ii) the audio-derived indicator from the live video stream, and (iii) the past image-derived or past audio-derived indicators from the live video stream.

18. The non-transitory computer-readable media of claim 15, the operations further comprising:
determining an image-derived non-currency indicator from the image portion of the live video stream; and
determining an audio-derived non-currency indicator from the audio portion of the live video stream,
wherein generating the predicted equivalent price in the user-selected currency comprises generating the predicted equivalent price in the user-selected currency based on (i) the image-derived indicator from the live video stream, (ii) the audio-derived indicator from the live video stream, (iii) the image-derived non-currency indicator from the live video stream, and (iv) the audio-derived non-currency indicator from the live video stream.

19. The non-transitory computer-readable media of claim 15, the operations further comprising:
obtaining a location of a user,
wherein generating the predicted equivalent price in the user-selected currency comprises generating the predicted equivalent price in the user-selected currency based on (i) the image-derived indicator from the live video stream, (ii) the audio-derived indicator from the live video stream, and (iii) the location of the user.

20. The non-transitory computer-readable media of claim 15, wherein the corresponding feature comprises a number, a symbol, a price tag, a product, an advertisement, an object, or an utterance in the live video stream.

* * * * *